United States Patent
Funakoshi et al.

(10) Patent No.: US 7,045,574 B1
(45) Date of Patent: May 16, 2006

(54) PRIMER COMPOSITION FOR POLYOLEFIN MATERIALS

(75) Inventors: Koji Funakoshi, Hirakata (JP); Hiroshi Iida, Hirakata (JP); Takeshi Ogawa, Wako (JP); Takashi Yamamoto, Wako (JP)

(73) Assignees: Nippon Bee Chemical Co., Ltd., Osaka (JP); Honda Giken Kogyo Kabushiki Kaisha, Tokyo (JP)

( * ) Notice: Subject to any disclaimer, the term of this patent is extended or adjusted under 35 U.S.C. 154(b) by 31 days.

(21) Appl. No.: 10/487,942

(22) PCT Filed: Nov. 15, 2000

(86) PCT No.: PCT/JP02/11975

§ 371 (c)(1),
(2), (4) Date: Mar. 4, 2004

(87) PCT Pub. No.: WO03/044110

PCT Pub. Date: May 30, 2003

(30) Foreign Application Priority Data

Nov. 21, 2001 (JP) .............................. 2001-356713

(51) Int. Cl.
*C08L 51/00* (2006.01)

(52) U.S. Cl. .............................. 525/64; 525/67; 525/69
(58) Field of Classification Search ................. 525/64, 525/67, 69

See application file for complete search history.

(56) References Cited

U.S. PATENT DOCUMENTS

| 4,133,786 A | 1/1979 | Harris et al. ............ 260/22 CB |
| 4,863,988 A | 9/1989 | Inagaki et al. ............... 524/315 |
| 5,932,654 A | 8/1999 | Ogawa et al. |
| 6,344,500 B1 * | 2/2002 | Ogawa et al. ............... 523/407 |

FOREIGN PATENT DOCUMENTS

| GB | 2 358 021 A1 | 7/2001 |
| JP | 52-98062 | 8/1977 |
| JP | 56-141326 | 11/1981 |
| JP | 61-287918 | 12/1986 |
| JP | 05-222320 | 8/1993 |
| JP | 07-150107 | 6/1995 |
| JP | 08/031779 | 2/1996 |

OTHER PUBLICATIONS

International Search Report PCT/ISA/210.

* cited by examiner

*Primary Examiner*—Jeffrey Mullis
(74) *Attorney, Agent, or Firm*—Arent Fox PLLC

(57) ABSTRACT

Acid anhydride denatured chlorinated polyolefin (component A) which is composed of a copolymer of propylene and α-olefin wherein the chlorine contents is 15 to 24% by weight, denatured amount of acid anhydride is 0.6 to 2.0%, weight average molecular weight is 40000 to 120000, and acrylic denatured alkyd resin (component B) which is comprised of alkyd resin polymer part (b1) whose iodine value is 80 or more and oil length is 35 to 70, and acrylic resin polymer part (b2) whose glass-transition temperature is not less than 50° C. wherein the weight average molecular weight is 10000 to 100000, weight ratio of the alkyd part and acrylic part is in a range of from 25/75 to 75/25, are used in a range of from 80/20 to 20/80 (A/B).

4 Claims, No Drawings

PRIMER COMPOSITION FOR POLYOLEFIN MATERIALS

BACKGROUND OF THE INVENTION

1. Field of the Invention

The present invention relates to a primer composition which is to be applied to a polyolefin material.

2. Background Art

Polyolefin materials exhibit superior properties such as moldability and chemical resistance, and because it is relatively inexpensive, it is widely used in plastic parts in industrial fields in recent years. For example, in an automobile, polyolefin is used for exterior parts such as bumpers or side panels, and it is also used for interior parts such as instrument panels. In these cases, it is usually applied to improve design value and weatherability of the automobile. However, adhesion to polyolefin materials is insufficient, and coatings do not adhere to polyolefin materials, and easily peels off. Therefore, a primer is applied on the polyolefin material to improve adherence before painting. In particular, the primer process is necessary for exterior parts of automobiles such as polyolefin bumpers.

As a primer for polyolefin materials for exterior parts for an automobile which exhibits superior resistance to high-pressure washing and gasohol resistance, a primer composition consisting of chlorinated polypropylene having a specific structure and acrylic denatured chlorinated polypropylene is disclosed in Japanese Unexamined Patent Application Publication No. 31779/96. However, because the primer composition mentioned above requires the molecular weight of acid anhydride denatured chlorinated polypropylene to be in a range of from 30000 to 36000, a process for controlling the molecular weight distribution is required in the producing process of acid anhydride denatured chlorinated polypropylene. Therefore, the price of the primer is increased because the production cost of the primer is higher than that of a usual polyolefin. Therefore, an invention of a primer for a polyolefin material for exterior parts for an automobile which has characteristics of resistance to high-pressure washing and gasohol resistance without adding acid anhydride denatured chlorinated polypropylene which is controlled in a specific range of molecular weight, is required.

SUMMARY OF THE INVENTION

Therefore, an object of the present invention is to provide a primer composition having sufficient adherence, resistance to high-pressure washing, and gasohol resistance with respect to a polyolefin material without adding acid anhydride denatured chlorinated polypropylene which is controlled to be in a specific range of molecular weight.

To solve the problems described above, the inventors performed further research and have invented a method which exhibits sufficient adherence, resistance to high-pressure washing, and gasohol resistance without adding chlorinated polyolefin which is set in a specific range of molecular weight disclosed in Japanese Unexamined Patent Application Publication No. 31779/96, and have completed the present invention.

In the primer composition for polyolefin materials of the present invention, sufficient adherence, resistance to high-pressure washing, and gasohol resistance are achieved by using acid anhydride denatured chlorinated polypropylene and acrylic denatured alkyd resin together. That is to say, the characteristics of the primer composition for polyolefin materials of the present invention are that the primer composition comprises acid anhydride denatured chlorinated polyolefin (component A) and acrylic denatured alkyd resin (component B), the weight ratio of the component A and the component B is 80/20 to 20/80, and these components have characteristics as explained below.

Component A contains propylene for 50 to 90 mol %, and comprises propylene-$\alpha$-olefin copolymer in which at least one kind of $\alpha$-olefin whose carbon number is 2 or 4 to 6 is contained. Furthermore, the chlorine content is 15 to 24% by weight, the acid anhydride denatured content is 0.6 to 2.0% by weight, and the weight average molecular weight is 40000 to 120000.

Component B comprises alkyd resin polymer part (b1) whose iodine value is more than 80 and oil length is 35 to 70, and acrylic resin polymer part (b2) whose glass-transition temperature is greater than 50° C. Furthermore, the weight average molecular weight is 10000 to 100000, and the weight ratio of b1 and b2 is 25/75 to 75/25.

1. Components of the primer composition for polyolefin material

The primer composition for polyolefin materials of the present invention comprises component A: acid anhydride denatured chlorinated polyolefin resin and component B: acrylic denatured alkyd resin, as essential components. It is desirable that the weight ratio of component A and B be 80/20 to 20/80, and more desirably, 70/30 to 30/70. In the case in which the weight ratio of acid anhydride denatured chlorinated polyolefin is greater than 80%, resistance to high-pressure washing is reduced. Furthermore, in the case in which the weight ratio of acrylic denatured alkyd resin is greater than 80%, the adherence to polyolefin material is reduced and the coated primer composition may peel off from the material. Each component is explained further below.

Component A: Acid Anhydride Denatured Chlorinated Polyolefin

Acid anhydride denatured chlorinated polyolefins of the present invention comprise propylene-á-olefin copolymer which contains at least one kind of á-olefin whose carbon number is 2 or 4 to 6 such as ethylene, butene, or pentene, and contains propylene at 50 to 99 mol %. The chlorine content is 15 to 24%, the acid anhydride denatured content is 0.6 to 2.0%, and the weight average molecular weight is 40000 to 120000.

The ratio of copolymerization of the $\alpha$-olefin in the propylene-$\alpha$-olefin copolymer mentioned above is in a range of from 1 to 50 mol %, and more desirably, in a range of from 5 to 30 mol %. In the case in which this ratio of copolymerization is below this range, crystallization is increased and storage stability after a coating is prepared is reduced. On the other hand, in the case in which the ratio of copolymerization is above this range, adherence and resistance to high-pressure washing are reduced. Weight average molecular weight of the propylene-α-olefin copolymer is in a range of from 40000 to 120000, more advantageously, in a range of from 50000 to 100000. In the case in which the weight average molecular weight is below this range, gasohol resistance is reduced, and in the case in which the weight average molecular weight is above the range, viscosity is increased, and this will hinder the coating process.

The chlorination of the propylene-α-olefin copolymer mentioned above can be applied by a technique which is known. For example, chlorination can be easily conducted by blowing chlorine gas into a chloroform solution of the polyolefin at a high temperature. In the present invention, it is desirable that the chlorinated ratio be in a range of from 15 to 24% by weight, and more desirably from 18 to 21% by weight. The chlorinated ratio is below the range mentioned above, storage stability after a coating is prepared is reduced, and seedings of the coating may form. On the other hand, in the case in which the chlorination ratio is above the range, the resistance to gasohol will be reduced.

Denaturation of acid anhydride is achieved, for example, by applying addition reaction of acid anhydride such as maleic anhydride or itaconic anhydride to the polyolefin described above. As this addition reaction method, a known method wherein acid anhydride is reacted with a radical initiator at high temperatures can be used. It is desirable that the reacted amount of acid anhydride be in a range of from 0.6 to 2.0% by weight, more desirably in a range of from 1.0 to 1.6% by weight. In the case in which the reacted amount of acid anhydride is below the range, gasohol resistance tends to be reduced, and on the other hand, when the reacted amount of acid anhydride is above the range, moisture resistance and storage stability after the coating is prepared is reduced.

As described above, chlorination process and acid anhydride addition reaction process at producing of the acid anhydride denatured chlorination polyolefin of the present invention are techniques which are already known, and either the chlorination process or the addition reaction process can be applied first.

Component B: Acrylic Denatured Alkyd Resin

Acrylic denatured alkyd resin used in the present invention comprises alkyd resin having an oil length of 35 to 70 in which oils of more than 80 by iodine value are used and denatured acrylic resin whose glass-transition temperature is more than 50° C. Furthermore, the weight average molecular weight is 10000 to 100000, and the weight ratio of the alkyd resin polymer part and the acrylic resin polymer part is in a range of from 25/75 to 75/25.

Oil used in the alkyd resin is not limited if the iodine value is greater than 80, such as castor oil, soybean oil, dehydrated castor oil, or linseed oil. Polybasic acid is also not particularly limited. For example, dicarboxylic acid such as orthophthalic acid, phthalic anhydride, tetrahydro orthophthalic acid, tetrahydro orthophthalic anhydride, or more than one kind of the acid anhydride, can be used. Furthermore, polyfunctional alcohol is also not limited. More than one kind of difunctional or higher alcohol such as pentaerythritol, glycerin, or neopentylglycol can be used.

The alkyd resin described above can be prepared by a known method. For example, under an atmosphere of inert gas, an alcoholysis reaction of oils and polyfunctional alcohol is conducted with lithium hydroxide catalyst at 200 to 250° C. Next, the alcoholysis reaction is completed by methanol tolerance, and after that, esterification is performed by conducting polyfunctional acid. Hydroxyl value of alkyd resin can be controlled by adding polyfunctional alcohol if necessary, and in such a case, oil length is set in a range of from 35 to 70, more desirably, from 50 to 60.

Acrylic denaturation can be conducted by a known method by using the alkyd resin described above. For example, the alkyd resin is heated to 120° C. under an atmosphere of an inert gas, a mixed solution of acrylic monomer and peroxide is dropped at a constant interval, and this is heated for a specific time after adding the rest of the peroxide, and thus acrylic resin denaturation can be conducted.

Although the glass-transition temperature of the acrylic resin polymer part is not particularly limited so long as it is above 50° C., it is advantageous that the glass-transition temperature be above 60° C. In the case in which the glass-transition temperature is below 50° C., resistance to high-pressure washing is reduced. As an acrylic monomer, acrylic ester monomer such as methyl acrylate, methyl methacrylate, butyl methacrylate, or 2-hydroxylethyl acrylate can be used, and also styrene, vinyl toluene, or α-methyl styrene can be used, and at least one kind thereof is selected so that the glass-transition temperature is above 50° C.

A suitable ratio of alkyd resin polymer part (b1) and acrylic resin polymer part (b2) is in a range from 25/75 to 75/25 by weight, more suitably from 40/60 to 60/40. In the case in which the weight ratio of the alkyd resin polymer part is less than 25%, gasohol resistance lowers, and on the other hand, the weight ratio of the acrylic resin polymer part is less than 25%, resistance to high-pressure washing is reduced. The weight average molecular weight of the acrylic denatured alkyd resin is in a range of from 10000 to 100000, and more desirably from 15000 to 60000. In the case in which the weight average molecular weight is less than 10000, resistance to high-pressure washing and gasohol resistance are not exhibited because of low strength of the coated film, and on the other hand, if the weight average molecular weight is more than 100000, viscosity is increased and atomization is reduced, and the smoothness of the coated film on polyolefin material is reduced. Furthermore, compatibility with acid anhydride denatured chlorinated polyolefin is reduced and storage stability after the coating is prepared is also reduced.

Other Components

The primer composition for polyolefins of the present invention comprises acid anhydride denatured chlorinated polyolefin and acrylic denatured alkyd resin described above as essential components, and other resin components such as acrylic resin, polyester resin, epoxy resin, acrylic denatured chlorinated polyolefin resin, cellulose resin, melamine resin, or block isocyanate resin can be added, if necessary. In these cases, 0 to 90 parts by weight of these resins can be added per 100 parts weight of the total of the acid anhydride denatured chlorinated polyolefin and acrylic denatured alkyd resin, and a coating is prepared by adding mainly aromatic hydrocarbon solvents such as toluene or xylene, or ester solvents such as ethyl acetate or butyl acetate, or ketone solvents such as methyl ethyl ketone or methyl isobutyl ketone. These organic solvents are usually added at 200 to 500 parts by weight per 100 parts by weight of the total of the acid anhydride denatured chlorinated polyolefin and acrylic denatured alkyd resin.

Workability of the primer composition for polyolefins of the present invention can be improved by coloring and the primer composition of the present invention can also be used as an electrostatic coating by being conductive with a pigment such as titanium oxide, carbonblack, or conductive carbonblack, or with an extender pigment such as talc, clay, or barium sulfate, or with various kinds of organic pigments. In these cases, 0 to 100 parts by weight thereof are added per 100 parts of weight of the total of acid anhydride denatured chlorinated polyolefin and acrylic denatured alkyd resin.

2. Coating by primer composition for polyolefin material

Although the method of coating a polyolefin material with the primer composition for polyolefin material of the present invention is not limited in particular, a typical spray coating is desirable. Drying method of the primer is also not limited in particular, and it can be dried by using air-drying, a hot air drying furnace, or a far infrared radiation drying furnace at room temperature to 120° C. for 3 to 30 minutes. The thickness of the coating film by the primer composition for polyolefins of the present invention is not limited in particular, but 5 to 15 μm is desirable. In the case in which the thickness is less than 5 μm, basic characteristics cannot be exhibited, and it is actually difficult to obtain a continuous film. On the other hand, in the case in which the thickness is above 15 μm, the primer may be sagging.

Decoration of polyolefin material can be achieved by coating and drying the primer of the present invention and coating the top coat over this primer. This top coating process is not particularly limited, and 2 pack system urethane coating, melamine coating, or lacquer coating can be applied usually, and as a coating process, 2C1B specifications including clear coat or mono coat 1C1B specifications is selected.

BEST MODE FOR CARRYING OUT THE INVENTION

Next, the present invention is explained in detail by way of examples.

A. Preparing of polyolefin material having primer coating

EXAMPLE 1

7 parts by weight of acid anhydride denatured chlorinated polyolefin (A1, solid) shown in Table 1, 7 parts by weight of acrylic denatured alkyd resin (B1, solid) shown in Table 2, 14 parts by weights of pigment (trade name: Titanium R-820, produced by Ishihara Sangyo Kaisha, Ltd.), and 72 parts by weight of toluene were mixed together, and thus the primer composition for the polyolefin of Example 1 was prepared.

TABLE 1

| Acid anhydride denatured chlorinated polyolefin | A1 |
|---|---|
| Mol ratio of propylene/ethylene | 90/10 |
| Content of maleic anhydride (%) | 1.3 |
| Weight average molecular weight | 80000 |

TABLE 2

| Acrylic denatured alkyd resin | | B1 | B2 | B3 | B4 | B5 | B6 | B7 | B8 |
|---|---|---|---|---|---|---|---|---|---|
| Composition of alkyd resin polymer part | Dehydrated castor oil | 50.5 | 50.5 | 50.5 | 50.5 | 50.5 | 50.5 | 50.5 | 50.5 |
| | Phthalic anhydride | 27.1 | 27.1 | 27.1 | 27.1 | 27.1 | 27.1 | 27.1 | 27.1 |
| | Pentaerythritol | 14.5 | 14.5 | 14.5 | 14.5 | 14.5 | 14.5 | 14.5 | 14.5 |
| | Neopentylglycol | 7.9 | 7.9 | 7.9 | 7.9 | 7.9 | 7.9 | 7.9 | 7.9 |
| | Total | 100 | 100 | 100 | 100 | 100 | 100 | 100 | 100 |
| Composition of acrylic resin polymer part | Methyl methacrylate | 61.0 | 61.0 | 61.0 | 69.9 | 61.0 | 61.0 | 51.0 | 61.0 |
| | Styrene | 20.0 | 20.0 | 20.0 | 20.0 | 20.0 | 20.0 | 20.0 | 20.0 |
| | n-Butyl acrylate | 18.4 | 18.4 | 18.4 | 9.5 | 18.4 | 18.4 | 18.4 | 18.4 |
| | Methacrylic acid | 0.6 | 0.6 | 0.6 | 0.6 | 0.6 | 0.6 | 0.6 | 0.6 |
| | Total | 100 | 100 | 100 | 100 | 100 | 100 | 100 | 100 |
| Characteristics of resin | Alkyd resin polymer part/acrylic resin polymer part | 50/50 | 30/70 | 70/30 | 50/50 | 20/80 | 80/20 | 50/50 | 50/50 |
| | Oil length of alkyd resin polymer part | 50 | 50 | 50 | 50 | 50 | 50 | 50 | 50 |
| | Glass-transition temperature of acrylic resin polymer part | 60 | 60 | 60 | 80 | 60 | 60 | 40 | 60 |
| | Weight average molecular weight | 30000 | 30000 | 30000 | 30000 | 30000 | 30000 | 30000 | 8000 |

Next, the primer composition for the polyolefins mentioned above whose viscosity was processed to be 12 seconds/NO4F. C. by xylene was sprayed on a polyolefin material (trade name: SP-850, produced by Idemitsu Petrochemical Co., Ltd.) which was washed with hot water and dried, by spray gun to form a coating having a thickness of 10 μm. It is dried at 80° C. for 10 minutes, to form a primer coating. Next, a base coating (trade name: R-301 silver metallic, produced by Nippon Bee Chemical Co., Ltd.) was coated on the primer coating to form a thickness of 20 μm and a top clear coating (trade name: R-288 clear, produced by Nippon Bee Chemical Co., Ltd.) was coated on the base coating to form a thickness of 30 μm, and was dried at 80° C. for 30 minutes, to form a top coating. Thus, the polyolefin material coated with the primer composition of Example 1 was prepared.

EXAMPLES 2 TO 6 AND COMPARATIVE EXAMPLES 1 TO 4

Compositions and kinds of the acid anhydride denatured chlorinated polyolefin and acrylic denatured alkyd resin in Example 1 were changed to conditions shown in Table 3 and 4, and thus primer compositions for polyolefin of Example 2 to 6 and Comparative Examples 1 to 4 were prepared and polyolefin materials coated with these primers were prepared in the same way shown in Example 1.

each of the Examples and the Comparative Examples, and the results are shown in Tables 3 and 4.

Methods of evaluation

1. Cross-cut adhesion test

The coated polyolefin materials obtained above were cut to form slashes by a cutter knife until the blade reached to the material under the coatings. Eleven slashes were made in the longitudinal direction and eleven slashes were made in the transverse direction at width of 2 mm, yielding 100 tessellated pieces. Peeling tests were performed by applying and peeling off Cellotape (registered trade mark) on the pieces. Remaining pieces were counted after peeling off the Cellotape.

2. Moisture resistance

The polyolefin materials were put in an atmosphere of 50° C., humidity 98%, for 240 hours and the peeling test described above was performed.

TABLE 3

|  | Examples | | | | | |
| --- | --- | --- | --- | --- | --- | --- |
|  | 1 | 2 | 3 | 4 | 5 | 6 |
| Acid anhydride denatured chlorinated polyolefin A1 | 7.0 | 10.5 | 3.5 | 10.5 | 3.5 | 7.0 |
| Acrylic denatured alkyd resin B1 | 7.0 | 3.5 | 10.5 | — | — | — |
| Acrylic denatured alkyd resin B2 | — | — | — | 3.5 | — | — |
| Acrylic denatured alkyd resin B3 | — | — | — | — | 10.5 | — |
| Acrylic denatured alkyd resin B4 | — | — | — | — | — | 7.0 |
| Titanium oxide | 14.0 | 14.0 | 14.0 | 14.0 | 14.0 | 14.0 |
| Toluene | 72.0 | 72.0 | 72.0 | 72.0 | 72.0 | 72.0 |
| Total | 100 | 100 | 100 | 100 | 100 | 100 |
| Adherence | 100/100 | 100/100 | 100/100 | 100/100 | 100/100 | 100/100 |
| Moisture resistance | 100/100 | 100/100 | 100/100 | 100/100 | 100/100 | 100/100 |
| Gasohol resistance | passing | passing | passing | passing | passing | passing |
| Resistance to high-pressure washing | passing | passing | passing | passing | passing | passing |

TABLE 4

|  | Comparative Examples | | | |
| --- | --- | --- | --- | --- |
|  | 1 | 2 | 3 | 4 |
| Acid anhydride denatured chlorinated polyolefin A1 | 12.6 | 1.4 | 7.0 | 7.0 |
| Acrylic denatured alkyd resin B5 | 1.4 | — | — | — |
| Acrylic denatured alkyd resin B6 | — | 12.6 | — | — |
| Acrylic denatured alkyd resin B7 | — | — | 7.0 | — |
| Acrylic denatured alkyd resin B8 | — | — | — | 7.0 |
| Titanium oxide | 14.0 | 14.0 | 14.0 | 14.0 |
| Toluene | 72.0 | 72.0 | 72.0 | 72.0 |
| Total | 100 | 100 | 100 | 100 |
| Adherence | 100/100 | 80/100 | 100/100 | 100/100 |
| Moisture resistance | 100/100 | 0/100 | 100/100 | 100/100 |
| Gasohol resistance | passing | 5 minutes | passing | passing |
| Resistance to high-pressure washing | 4 mm | 9 mm | 1 mm | 4 mm |

B. Performance evaluation of primer coatings

The inventors evaluated the coating performance of the polyolefin materials coated with the primer compositions of 3. Gasohol resistance The polyolefin materials were cut to have dimensions of 3 cm by 3 cm, and were put into a gasohol prepared by mixing commercial regular gasoline and ethanol at a ratio of 90:10 by volume at 20° C. The time which was required for the primer coating to peel 2 mm from the cut end of the polyolefin material was measured. A required time of more than 30 minutes was regarded as passing the test.

4. Resistance to high-pressure washing

The polyolefin materials were cut to form slashes by a cutter knife for lengths of 7 cm until the blade reached the material under the coatings and fixed horizontally, and high-pressure water at 20° C., pressure 70 kg/cm$^2$ was blown from an angle of 30°, from a distance of 20 cm for 30 seconds. The length of peeled primer coating from the polyolefin material was measured. Pieces in which peeling did not occur were regarded as passing the test.

C. Results of evaluation

As is obvious from Tables 3 and 4, Examples 1 to 6 exhibited superior performance in adherence, moisture resistance, gasohol resistance, and resistance to high-pressure washing. However, in Comparative Example 1, in spite of high content of acrylic resin polymer component in acrylic denatured alkyd resin, resistance to high-pressure washing was inferior because the ratio of acrylic denatured alkyd resin was low. In Comparative Example 2, in spite of high content of alkyd resin polymer component in acrylic denatured alkyd resin, adherence, moisture resistance, gasohol resistance and resistance to high-pressure washing were inferior because the ratio of acid anhydride denatured chlorinated polyolefin was low. Furthermore, in Comparative Example 3, though there was no problem in the ratio of acid anhydride denatured chlorinated polyolefin and acrylic denatured alkyd resin, resistance to high-pressure washing was inferior because the glass-transition temperature of the acrylic resin polymer part was low. Furthermore, in Comparative Example 4, resistance to high-pressure washing was inferior because the molecular weight of the acrylic denatured alkyd resin was low.

As explained so far, the primer composition for polyolefin material of the present invention can exhibit sufficient adherence, resistance to high-pressure washing, and gasohol resistance to polyolefin material by using component A: acid anhydride denatured chlorinated polyolefin and Component B: acrylic denatured alkyd resin in a content ratio of from 80/20 to 20/80. Therefore, the primer composition for polyolefin materials of the present invention is extremely effective as a primer for polyolefin material for exterior parts for an automobile.

What is claimed is:

1. A primer composition for polyolefin material, the primer composition comprising:
    a component A comprising acid anhydride modified chlorinated polyolefin consisting of propylene-α-olefin including
    at least one kind of α-olefin whose carbon number is 2 or 4 or 5 or 6;
    a propylene content of 50 to 99 mol %;
    a chlorine content of 15 to 24% by weight;
    an acid anhydride content of 0.6 to 2.0% by weight; and
    a weight average molecular weight of 40000 to 120000; and
    a component B comprising acrylic modified alkyd resin in which alkyd resin polymer part (b1) whose iodine value is 80 or more and oil length is 35 to 70%, and acrylic resin polymer part (b2) whose glass-transition temperature is not less than 50° C., wherein the weight average molecular weight is 10000 to 100000, and a weight ratio of b1/b2 is 25/75 to 75/25;
    wherein a weight ratio of the component A and the component B is 80/20 to 20/80.

2. A method for production of a primer composition for polyolefin material including acid anhydride modified chlorinated polyolefin and acrylic modified alkyd resin, the method comprising:
    obtaining acid anhydride modified chlorinated polyolefin by copolymerizing propylene and α-olefin, conducting chlorination of this propylene-α-olefin copolymer, and conducting addition reaction by adding acid anhydride;
    obtaining acrylic modified alkyd resin by conducting alcoholysis reaction of oil and polyhydric alcohol, performing esterification by using a polybasic acid, and conducting acrylic modification by adding acrylic monomer and peroxide; and
    mixing acid anhydride modified chlorinated polyolefin, acrylic modified alkyd resin, and organic solvent, so as to obtain a coating.

3. The method for production of a primer composition for polyolefin material according to claim 2, wherein the primer composition for polyolefin material is colored by applying a pigment.

4. The method for production of a primer composition for polyolefin material according to claim 2, wherein the primer composition for polyolefin material is prepared to be conductive by coating material for electrostatic coating.

* * * * *

UNITED STATES PATENT AND TRADEMARK OFFICE
CERTIFICATE OF CORRECTION

PATENT NO. : 7,045,574 B1
APPLICATION NO. : 10/487942
DATED : May 16, 2006
INVENTOR(S) : Koji Funakoshi et al.

It is certified that error appears in the above-identified patent and that said Letters Patent is hereby corrected as shown below:

Title page I

Item [22], please correct the PCT Filed date to read -- Nov. 15, 2002 --.

Signed and Sealed this

Twenty-second Day of August, 2006

JON W. DUDAS
*Director of the United States Patent and Trademark Office*